Patented May 31, 1938

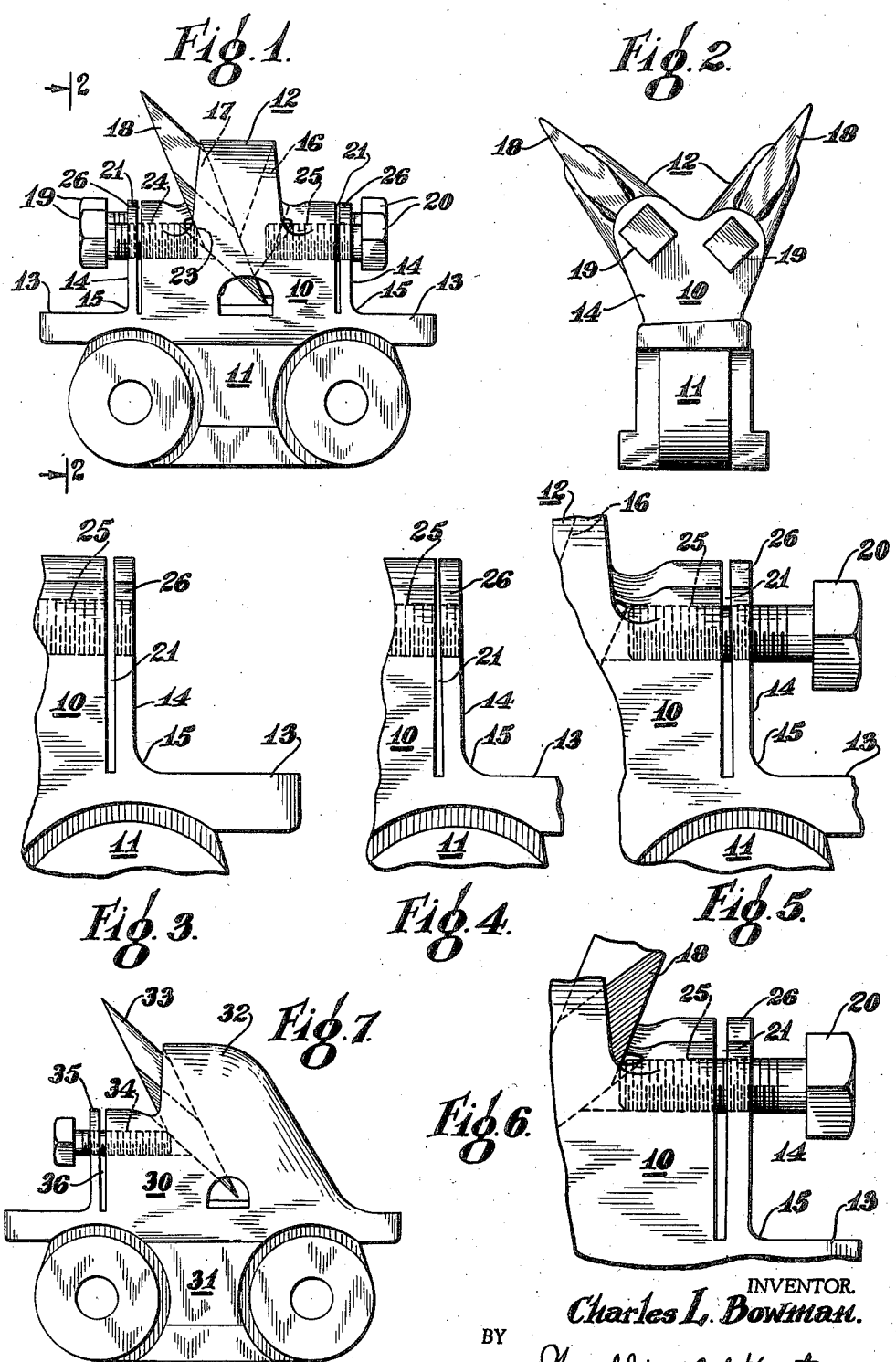

2,118,878

UNITED STATES PATENT OFFICE 2,118,878

MINING MACHINE CHAIN LUG

Charles L. Bowman, Canton, Ohio, assignor to The Bowdil Company, a corporation of Ohio Application July 17, 1937, Serial No. 154,129

4 Claims. (Cl. 262—33)

My invention relates in general to mining machine chain lugs, and more particularly to means for preventing the set screws and cutting bits from becoming lost.

The loss in set screws and bits occurs because of chattering and vibration resulting from pounding and jarring during the cutting operation. Furthermore, in the operation of mining machine chain lugs, the excessive pounding and pressure may spring the chain lugs, in which event the set screws may become slightly retracted from the cutting bits to permit the set screws to unscrew and become lost. The cutting bits and set screws are both hardened so that when the set screws are turned in against the cutting bits for holding them in place the set screws cannot dig into the hardened cutting bits with the result that the slightest strain may cause a clearance between the end of the set screws and the cutting bits in which case the pressure of the set screws against the cutting bits can no longer cause the set screws to remain in a fixed position.

With reversible mining machine chain lugs such as the embodiment shown, described and claimed in my application Serial Number 115,491 filed December 12, 1936, for reversible mining machine chains, the set screws for the unoccupied bit recesses may become readily lost as there are no bits against which the end of the set screws may engage to help prevent the turning of the set screws.

Therefore, an object of my invention is the provision of a mining machine chain lug having means to prevent the set screw from turning and becoming lost.

Another object of my invention is to provide for exerting a pressure in a direction parallel with the axis of the set screw to bind the set screw from turning and becoming lost.

Another object of my invention is to provide an additional binding action which results when the set screw is turned against the cutting bit or other hardened surface.

A further object of my invention is to provide a transverse slot relatively close to the end face of the chain lug and produce a resiliently mounted space member adapted to engage a thread of the set screw and exert pressure in a direction parallel with the axis of the set screw to bind the set screw from turning, and adapted to cause an additional binding action resulting from the reversed inclined position assumed by said resilient mounted space member when the set screw is turned against the bit or other hardened surface.

Another object of my invention is to cause a set screw to engage the lowermost face portion of the cutting bit so that the cutting bit may be removed upon a slight retraction of the set screw.

Another object of my invention is to provide for binding a set screw and prevent it from turning when the set screw engages a surface.

Another object of my invention is to provide for keeping a set screw from turning so that it is no longer necessary to turn the set screw tight against the cutting bit or other surface in the hope of producing enough longitudinal pressure against the threads to bind the set screw from turning.

Another object of my invention is to provide for preventing a set screw from turning so that the set screw may be retained in position when the bit recess is unoccupied or when the set screw is not engaging a surface.

Other objects and a fuller understanding of my invention may be had by referring to the following description and claims taken in conjunction with the accompanying drawing, in which:

Figure 1 illustrates a side elevational view of a mining machine chain lug embodying the features of my invention;

Figure 2 is a front view of the mining machine chain lug shown in Figure 1 and taken along the line 2—2 thereof;

Figure 3 is a fragmentary enlarged view of a mining machine chain lug showing a slot provided therein before it is compressed and heat treated;

Figure 4 is a similar enlarged view but shows the mining machine chain lug after it is slotted, compressed and heat treated;

Figure 5 shows a similar enlarged view with the set screw in position as it appears when the bit recess is unoccupied;

Figure 6 is a similar enlarged view with the set screw in position as it appears when it engages the cutting bit; and Figure 7 shows an embodiment of my invention in a mining machine chain lug which is arranged to operate in one direction only.

In the drawing, the reference character 10 designates a reversible mining machine chain lug which may be operated in either the forward or reverse direction by changing the position of the cutting bits. The lower portion of the chain lug, designated by the reference character 11, is arranged to be connected to other chain lugs to make up a complete cutting chain which is adapted to revolve around a cutter bar. The lower portion 11 of the lug is provided with end projections 13 which are arranged to cooperate with the chain links to improve the operation of the travel of the cutting chain. The upper portion of the chain lug, designated by the reference character 12, is provided with two oppositely disposed bit recesses 16 and 17. As illustrated the bit recess 17 is provided with a cutting bit 18 and the bit recess 16 is unoccupied. A set screw 19, which threadably engages a threaded female opening 24 is arranged to engage the forward face of the cutting bit 18 at 23 to hold the cutting bit 18 in the bit recess 17. The cutting bit 18 is mounted into the recess 16 for reverse cutting, and a set screw 20, which threadably engages a female threaded opening 25, is arranged to engage the bit 18 and hold it in position. In operation the set screw associated with the unoccupied bit recess may readily become lost because there is nothing to bind the set screw in its threaded opening to prevent it from turning. In operation the body of the chain lug may become sprung or distorted when the bit strikes hard cutting material. The distortion produces a slight clearance between the end of the set screw and the face of the cutting bit so that there is no longer any binding action or pressure on the threads of the set screw to bind it in the female threaded opening, and under this condition the set screw is free to unscrew and become lost through the vibration incident to the cutting operation. In practice the operator uses a long wrench and gives a heavy heave and turns the set screw against the face of the bit with a tremendous pressure in the hope that when the bit strikes a hard place during the cutting operation it will not sprain the body of the chain lugs sufficiently to provide a clearance between the end of the set screw and the cutting bit and permit the set screw to become loose and eventually lost. Not infrequently an operator may turn the set screw with such a heavy heave that the pressure is sufficient to fracture the body of the chain lug and thereby necessitate the complete dismantling of the cutting chain and mounting a new chain lug.

To overcome the difficulties of keeping a set screw from becoming loose and lost, I provide for cutting a transverse slot 21 relatively close to the end faces 14 of the chain lug. The slots 21 are cut into the chain lug prior to the heat treating of the chain lug. Figure 3 shows an enlarged view of the transverse slot as it appears when it is first cut. The depth of the slot extends below the threaded female set screw opening and to a point substantially on the same level as the upper surface of the end projections 13. The relatively deep slots 21 give a large amount of resiliency to the thin spaced portions 26 which are formed when the slots are cut. After the chain lug is slotted the thin portions 26 are bent inwardly as shown in Figure 4, after which they are heat treated producing a resilient action. The relatively thin portions 26 exert a pressure in a direction parallel to the axis of the set screws and thereby bind the set screws from turning. The junction between the end projections 13 and the end faces 14 of the lug may be rounded as at 15 to give additional strength and resiliency to the thin portions 26 to prevent them from breaking off.

In Figure 5, I show a set screw in position as it appears when the bit recess is unoccupied. In this position the thin resilient space portion 26 is sprung outwardly producing a substantially uniform width of the slot 21, with the result that the threads of the thin resilient space portion exerts a pressure upon the threads of the set screw in a direction substantially parallel with the axis of the set screw and binds the set screw from turning.

When the set screw is turned in against the bit as shown in Figure 6 there is produced an additional binding action resulting from the reversed inclined position taken by the relatively thin resilient spaced portion which causes the threads to assume an unparallel position with the threads of the set screw and produce a cocking action. This cocking action makes it no longer necessary to turn the set screw against the bit or other surface with a heavy force in the hope of preventing the set screw from turning. In other words, the set screw may be turned in with a relatively small wrench and with a relatively small force and obviate the dangers of fracturing the chain lug.

Even though the chain lug may become sprung or distorted by the bit striking a hard place to cut and provide a slight clearance between the end of the set screw and the cutting bit, the set screw will still hold the bit in the recess as it is prevented from turning by the binding action afforded by the thin resilient space portion 26. The bit may, however, be removed for replacement or for reversing the cutting points by turning the set screw slightly as the end of the set screw engages the lower end of the face of the cutting bit where a slight retraction will give enough clearance to remove the bit.

In Figure 7 I show a chain lug 30 adapted to be operated in one direction having a chain portion 31 and a bit holding portion 32 provided with a bit recess to receive the bit 33. A set screw 34 is provided to hold the bit 33 in place. The left hand end of the chain lug is slotted as at 36 and provides a resiliently mounted thin portion 35 adapted to prevent the set screw from becoming loose.

My invention is not limited to set screw which engage cutting bits but covers set screws used to engage other surfaces.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A mining machine chain lug having an end face and a recess spaced from said end face to receive a hardened bit, said lug having an opening with female threads extending from the end face to the recess for receiving a set screw with a hardened end to engage the hardened bit and hold same in the recess, said lug having a transverse slot relatively close to the end face and extending below the threaded female opening to produce a resiliently mounted spaced member adapted to engage a thread of the set screw and exert pressure in a direction parallel with the axis of the set screw to bind the set screw from turning and adapted to cause an additional binding action resulting from the reversed inclined position assumed by said resiliently mounted spaced member when the set screw is tight against the bit.

2. A mining machine chain lug having a set screw arranged to engage a hardened surface, said lug having an end surface and a transverse slot relatively close thereto extending below the set screw to produce a resiliently mounted spaced member adapted to engage a thread of the set screw and exert pressure in a direction parallel with the axis of the set screw to bind the set screw from turning.

3. A mining machine chain lug having a set screw arranged to engage a hardened surface, said lug having an end surface and a transverse slot relatively close thereto extending below the set screw to produce a resiliently mounted spaced member adapted to engage a thread of the set screw and exert pressure in a direction parallel with the axis of the set screw to bind the set screw from turning, and adapted to cause an additional binding action resulting from the reversed inclined position assumed by said resiliently mounted spaced member when the set screw engages the said hardened surface.

4. A mining machine chain lug having an end projection and an end face and a recess spaced from said end face to receive a hardened bit, said lug having an opening with female threads extending from the end face to the recess for receiving a set screw with a hardened end to engage the hardened bit and hold same in the recess, said lug having a transverse slot relatively close to the end face and extending below the threaded female opening and substantially to the end projection to produce a resiliently mounted spaced member adapted to engage a thread of the set screw and exert pressure in a direction parallel with the axis of the set screw to bind the set screw from turning and adapted to cause an additional binding action resulting from the reversed inclined position assumed by said resiliently mounted spaced member when the set screw is tight against the bit.

CHARLES L. BOWMAN.